United States Patent [19]

Rossani

[11] 4,179,741
[45] Dec. 18, 1979

[54] MAGNETIC COMPASSES

[75] Inventor: Aldo Rossani, Rome, Italy

[73] Assignee: C.I.E.R. Compagnia Importazioni Esportazioni Rappresentanze S.R.L., Rome, Italy

[21] Appl. No.: 822,415

[22] Filed: Aug. 8, 1977

[30] Foreign Application Priority Data

Aug. 26, 1976 [IT] Italy .............................. 51036 A/76

[51] Int. Cl.$^2$ ....................... G01C 17/28; G06F 15/20
[52] U.S. Cl. ..................................... 364/457; 33/356;
340/347 P; 364/559
[58] Field of Search .................. 340/347 SY, 197, 198,
340/347 P; 364/457, 447, 559, 815; 33/355 R,
356, 361; 324/83 D

[56] References Cited

U.S. PATENT DOCUMENTS

| 3,555,541 | 1/1971  | Egerton et al. ....................... 364/815 |
| 3,746,842 | 7/1973  | Fowler ................................... 364/457 |
| 3,851,330 | 11/1974 | Huber ............................. 340/347 SY |
| 3,878,535 | 4/1975  | Twiss ............................. 340/347 SY |
| 3,918,044 | 11/1975 | Alpatoff et al. ................ 340/347 SY |
| 3,938,257 | 2/1976  | Erspamer ................................ 33/361 |
| 3,975,621 | 8/1976  | Fowler ................................... 364/457 |
| 3,991,361 | 11/1976 | Mattern et al. ......................... 33/356 |
| 4,032,758 | 6/1977  | Lewis .................................... 364/457 |
| 4,038,528 | 7/1977  | Fowler ................................... 364/457 |

*Primary Examiner*—Felix D. Gruber

*Attorney, Agent, or Firm*—Eyre, Mann, Lucas & Just

[57] ABSTRACT

A static compass capable to supply a digital indication of the magnetic head angle, comprising circuits for supplying two signals corresponding to two orthogonal components of the horizontal component of the earth magnetic field, said signals consisting of a carrier frequency, amplitude modulated according to the value of said orthogonal components, a circuit for introducing a phase shift through 90° electric on one of said modulated frequencies, a circuit effecting the sum and the difference of said two signals, a circuit for measuring the difference of phase between said sum and difference signals and for introducing count pulses in a number proportional to said difference of phase in order to drive digital counters associated to digital display elements showing the head angle with respect to the horizontal component of the earth magnetic field, further including apparatus for indicating the error with respect to a selected head angle, said apparatus including an arrangement for manually entering and memorizing said head angle, a counter predisposed for counting in amplitude and sign the error between the measured head angle and the selected angle, and an analogic/digital display arranged so as to indicate the amount, the direction and the variation in time of the error between the measured orientation and the orientation as set and memorized.

5 Claims, 11 Drawing Figures

*fig. 1*

ATHWORTSHIP DIRECTION (POSITIVE WHEN DIRECTED STARBOARD)

FORE-AND-AFT DIRECTION (POSITIVE WHEN DIRECTED FORWARD)

PERPENDICULAR TO KEEL DIRECTION +z (POSITIVE WHEN DIRECTED DOWNWARD)

*fig. 2*

MAGNETIC FIELD OF THE EARTH: F
HORIZONTAL COMPONENT OF F: H
VERTICAL COMPONENT OF F: Z
MAGNETIC HEADING: $\theta = \tan^{-1} \frac{-Y}{X}$
COMPONENT OF H IN $\overrightarrow{ox}$ DIRECTION: $X = H\cos\theta$
COMPONENT OF H IN $\overrightarrow{oy}$ DIRECTION: $Y = -H\sin\theta$

MAGNETIC COMPASSES

BACKGROUND AND SUMMARY

The present invention relates to an improved static compass suitable to supply a digital indication of the magnetic head angle, of the difference angle between a selected head angle and the magnetic head angle itself. The static compass according to the present invention comprises also means for correcting the permanent magnetic fields and the induced magnetic fields.

In the following specification, only for sake of simplicity it will be assumed that the angles will be measured in integer sexagesimal degrees.

It will be evident that the principles set out are valid also in cases when a different unit will be used, or fractions of degree will be required.

In the following specification, still for sake of clearness it will be assumed that the magnetic sensor will operate as a second harmonic saturable indicator.

It will be obvious that the principles as set out are valid also in cases wherein other magnetic sensors will be used, for instance those operating as fundamental frequency saturable indicators or peak inductors.

The compass system according to the present invention provides the use of a magnetic sensor, that is conventional detector of the horizontal component of the earth magnetic field, such as for instance a conventional fluxgate. It is known that a device of this kind is energized by an alternating current signal having a $f_1$ frequency, and supplies, if the case may be through a Scott T transformer, a frequency spectrum including two signals having the frequency $2 f_1$ the amplitude of which depends upon the angle $\theta$ between the horizontal component of the magnetic north and the magnetic axis of reference of said detector. This part of the system is commercially available and thus it will not be described in detail.

Figure 1:
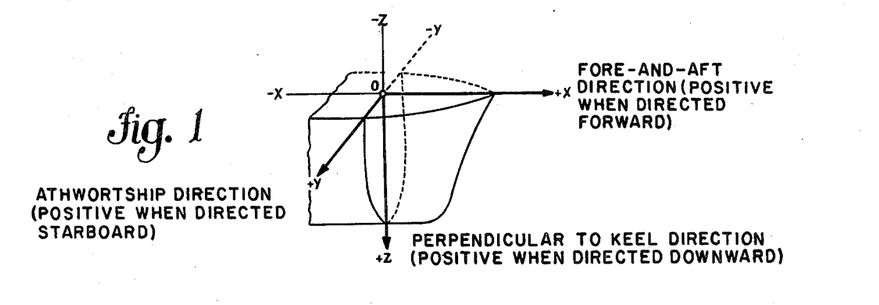
FIG. 1 shows a coordinate system employed in the present specification.

Thus, as reference axes are assumed to be three cartesian axes rigid with the sensor and the vehicle (assumed in normal trim conditions, namely with no list) whereon the sensor is fixed. The three cartesian axes are oriented as shown in FIG. 1, with their origin in the point where the sensor is located.

Figure 2:
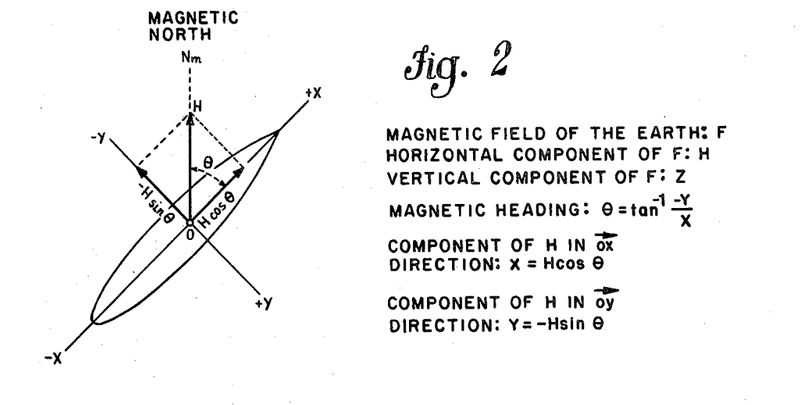
FIG. 2 shows components of the magnetic field in one of the planes defined by the coordinate system.

The magnetic field at that point is set out by the known Poisson equations:

$$\begin{cases} X_1 = X + aX + bY + cZ + P & (1) \\ Y_1 = Y + bX + eY + fZ + Q & (2) \\ Z_1 = Z + gX + hY + kZ + R & (3) \end{cases}$$

where X, Y, Z are the orthogonal components of the magnetic earth field F as shown in FIG. 2.

Assuming that the sensor is of the type with two orthogonal axes (or anyway transformed to two orthogonal axes by a Scott T transformer) and that the two axes of the sensor are oriented exactly as the horizontal reference axes $\overline{OX}$ and $\overline{OY}$, the second-harmonic components at the output of the sensor can be expressed by the two equations:

$$\begin{cases} V_{X1} = K(X + aX + bY + cZ + P)\cos 2\omega_1 t & (4) \\ V_{Y1} = K(Y + dX + eY + fZ + Q)\cos 2\omega_1 t & (5) \end{cases}$$

where $\omega_1 = 2\pi f_1$ and K is a non dimensional coefficient of proportionality depending upon the characteristics of the sensor, the possible Scott T transformer and the analogic part of the processor.

To the two values $V_{X1}$ and $V_{Y1}$ corresponds the angle $\theta_1$ given by the expression:

$$\theta_1 = \arctan \frac{V_{Y1}}{V_{C1}} = \arctan \frac{-(Y + dY + eY + fZ + Q)}{X + aX + bY + cZ + P} \quad (6)$$

with $\theta_1$ head angle (with respect to magnetic nord) which would be indicated by the compass if no correction would be effected and with $\theta$ head angle with respect to the magnetic north, given by the expression $$\theta = \arctan \frac{-V_Y}{V_X} = \frac{-Y}{X} \quad (7)$$

The error angle in the absence of correction is given by the expression:

$$\epsilon = \theta - \theta_1 \quad (8)$$

The correcting circuits, once the correcting procedure has been correctly carried out, serve to annul $\epsilon$ and thus they transform the input signals of the equations (4) and (5) into the output signals as follows:

$$\begin{cases} V_X = K'X \cos 2\omega_1 t & (9) \\ V_Y = K'Y \cos 2\omega_1 t & (10) \end{cases}$$

The signal represented by the equation (10) is submitted to a phase shift of 90° whereby it will be transformed into the signal as follows as:

$$V'_Y = K'Y \sin 2\omega_1 t \quad (11)$$

By adding and subtracting the (9) and the (11), two signals: sum S, and difference D will be obtained, respectively:

$$S = K'(X \cos 2\omega_1 t + Y \sin 2\omega_1 t) \quad (12)$$

$$D = K'(X \cos 2\omega_1 t - Y \sin 2\omega_1 t) \quad (13)$$

Keeping into account the fact that the $$X = H \cos \theta$$

$$Y = -H \sin \theta$$

it will be possible to write for the sum and difference signals:

$$S = K'H \cos (2\omega_1 t + \theta) \quad (14)$$

$$D = K'H \cos (2\omega_1 t - \theta) \quad (15)$$

It is to be noted that the sum and difference signals S, D are two sinusoidal signals having amplitudes independent from $\theta$, an angular frequency $2\omega_1$, and phase shifted between themselves through $2\theta$.

This angle $2\theta$ is proportional to the time lasting from the passage through zero of the sinusoid representing S and the passage through zero of the sinusoid representing D.

Once $2\theta$ is known, it will be possible to obtain the angle $\theta$ representing the head angle with respect to the magnetic north.

The compass system according to the present invention will be now described in detail with reference to the attached drawings.

BRIEF DESCRIPTION OF THE DRAWINGS

FIG. 8 shows a block diagram of a gate circuit.

DETAILED DESCRIPTION OF THE PREFERRED EMBODIMENT

Figure 3:
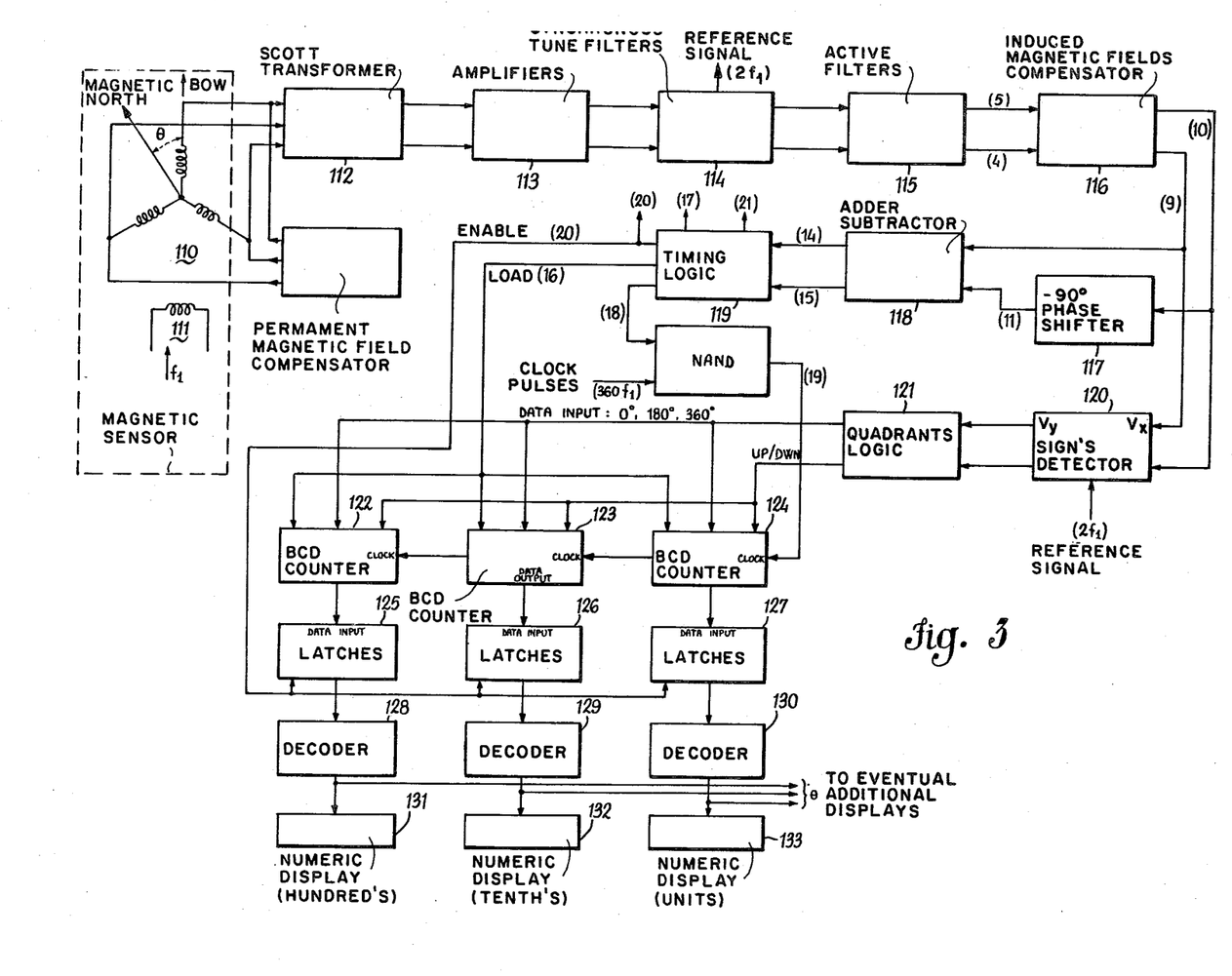
FIG. 3 shows a block diagram of the system of the present invention.
Figure 4:
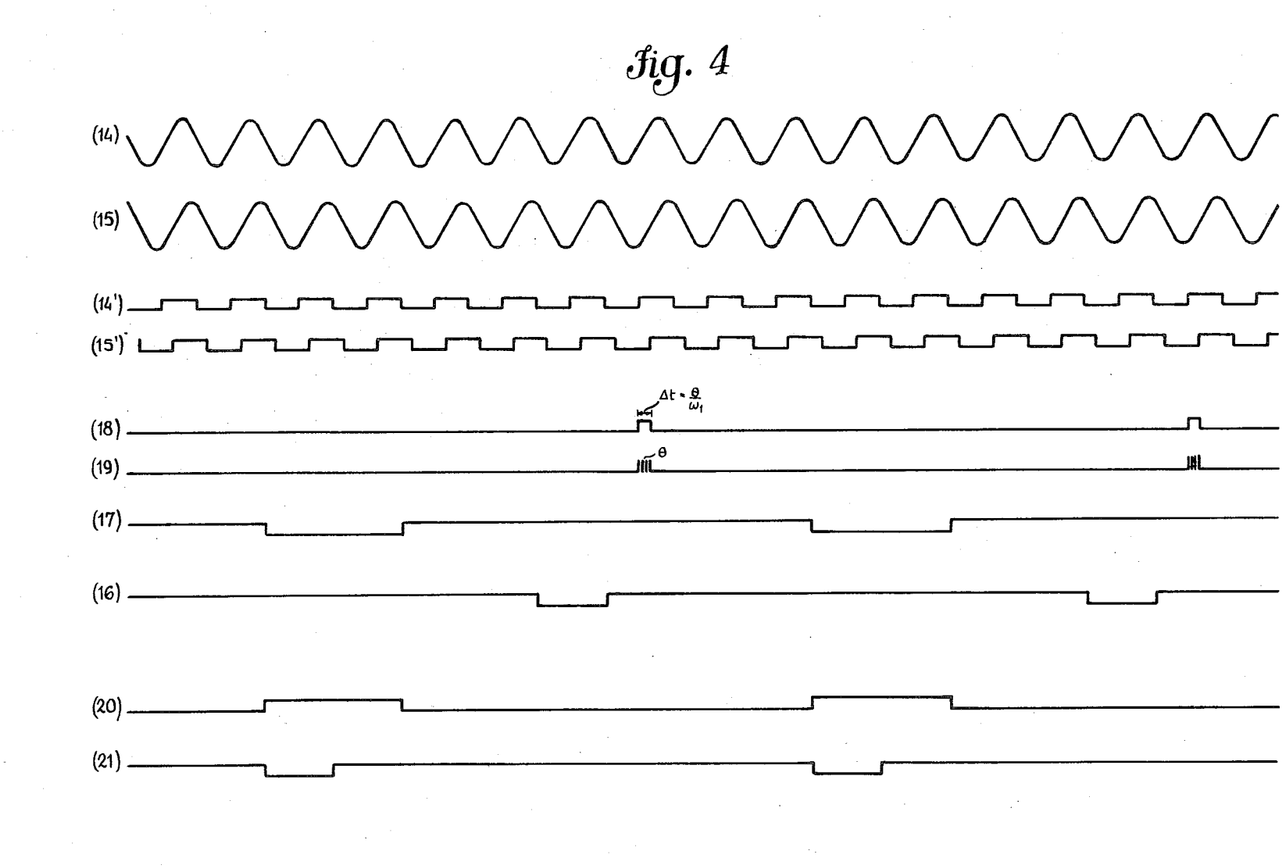
FIG. 4 shows wave forms employed in the present invention.

Let us make reference to FIGS. 3 and 4. The sensor 110 of the horizontal component of the earth magnetic field is energized in a known way by a primary 111 energized at a frequency $f_1$. On the secondary windings of the sensor 110, namely at the input of the possible Scott T transformer 112, there are three signals, while at the output from the Scott T transformer there will be two signals which are amplified in the amplifiers 113, submitted to a filtering in the synchronous filters 114 and further filtered in the linear selective filters 115 in order to supply the two outputs (4), (5) previously denoted by $V_{X1}$, $V_{Y1}$. The output voltages from the linear filters 115 reach an induced magnetic field correcting unit denoted generally by 116 which will be better illustrated and described later on.

At the output from the unit 116 for correcting the induced magnetic fields are present the two voltages identified by the equations (9), (10) as previously cited. The signal identified by the equation (10), namely $$V_Y = K'Y \cos 2\omega_1 t$$

is sent to the phase shifter 117 which operating in a known way, introduces a phase shift of $-90°$ electric whereby the signal (10) at the output from the phase shifter will be represented by (11), namely $V'_Y = K'Y \sin 2\omega_1 t$.

The signals represented by the relations (9), (11) are sent to a circuit which in a known way effects the sum and the difference thereof obtaining finally the two signals represented by the relations (14), (15):

$$S = K'H \cos(2\omega_1 t + \theta) \quad (14)$$

$$D = K'H \cos(2\omega_1 t - \theta) \quad (15)$$

The circuit effecting the sum and the difference of the signals (9), (11) is denoted generally by 118 and it will not be described in detail as it is a circuitry unit known to a person skilled in the art. The signals (14), (15) of sum and difference are carried to the block 119 of the timing logic which serves the functions which will be described later on.

The signals (9) (10), $V_x$ and $V_y$ respectively are applied to a "sign" detector thereof 120. The sign detector 120 is a circuit of a known type driven by the reference voltage having the frequency $2f_1$ and controls a predisposing logic circuit 121 for the counters 122, 123, 124. The predisposing logic circuit 121 controls the counters 122, 123, 124 according to the terms of the following table

| Sign of | | Quadrant of $\theta$ | Status of counters (BCD) | | Direction of count (UP/DOWN) |
|---|---|---|---|---|---|
| $-V_Y$ (sine) | $V_X$ (cosine) | | Initial (data input) | Final limit | |
| + | + | First | 000 | 090 | increase (UP) |
| + | − | Second | 180 | 090 | decrease (DWN) |
| − | − | Third | 180 | 270 | increase (UP) |
| − | + | Fourth | 360 | 270 | decrease (DWN) |

As said, the sign of $V_Y$ and $V_X$ will be determined by comparing the phase of these signals with that of the reference voltage $2f_1$.

Denoting by:

Y the sign of $-V_Y$ (0 if negative, 1 if positive)

X the sign of $V_X$ (0 if negative, 1 if positive)

$c_n$ the counting direction (0 if decreasing, 1 if increasing)

we shall obtain the expressions of Boolean algebra which define the predisposition logic:

$$c_n = yx + \bar{y}\bar{x}$$

$$000 = yx$$

$$180 = \bar{x}$$

$$360 = \bar{y}x$$

When the output signal (16) from the timing logic circuit 119 is at a logic level "0", the counters 122, 123, 124 are brought to the DATA INPUT position which can be

| 000 | −180 | 360 |
|---|---|---| according to the signals of $V_Y$ and $V_X$. When the signal (20) reaches the logic level "1" the status of the counters 122, 123, 124 is memorized in the memories 125, 126, 127, decoded in decoders 128, 129, 130 and displayed in the digital indicators 131, 132, 133 for reading the degree hundreds, the tens and the units. This forms the indication of the head angle.

Besides the "head angle" the system according to this invention supplies the indication of the "selected head angle" and of the "error of the head angle" by the circuitry which will be now described.

Figure 5:
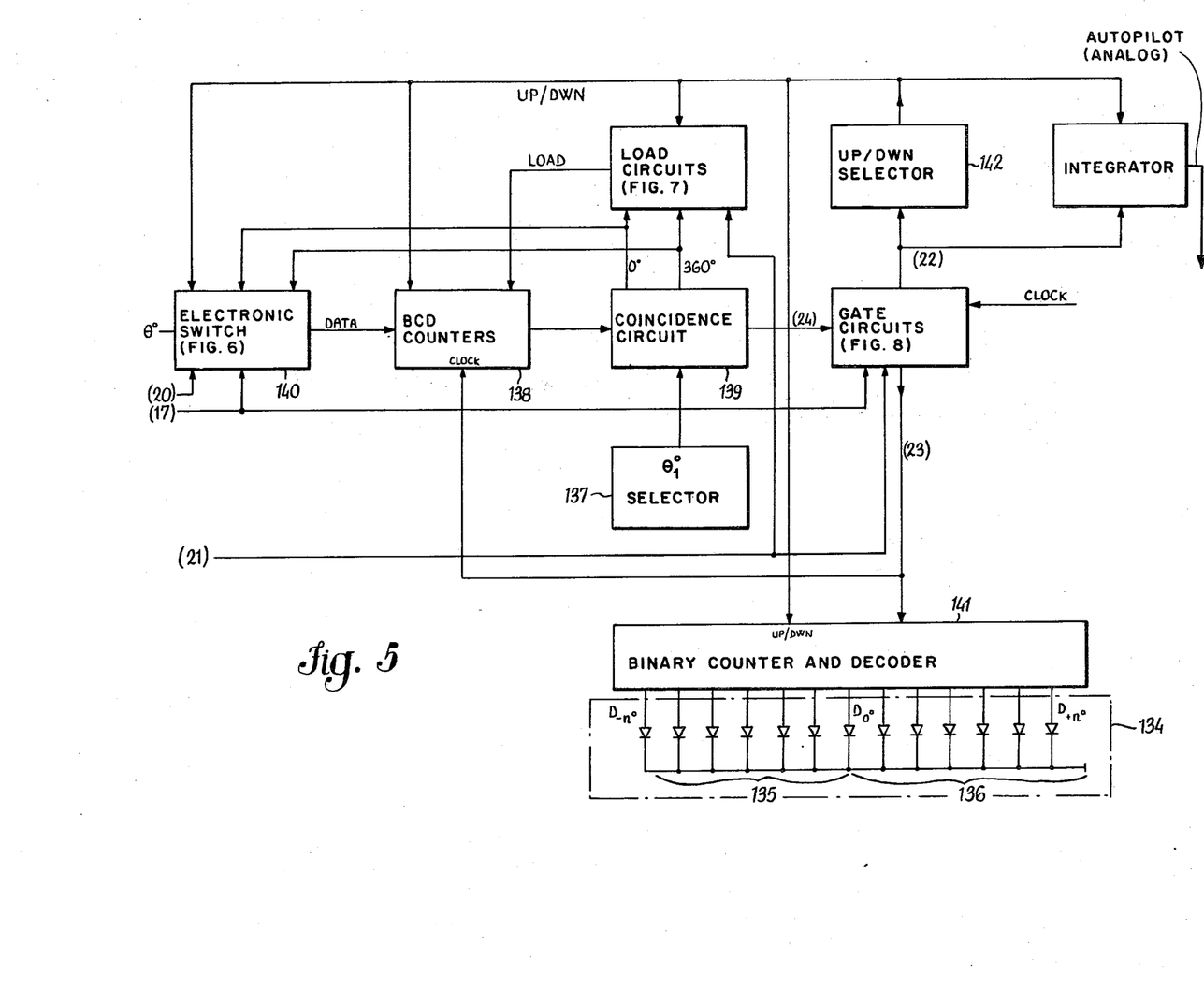
FIG. 5 shows a block diagram of a portion of the system.
Figure 7:
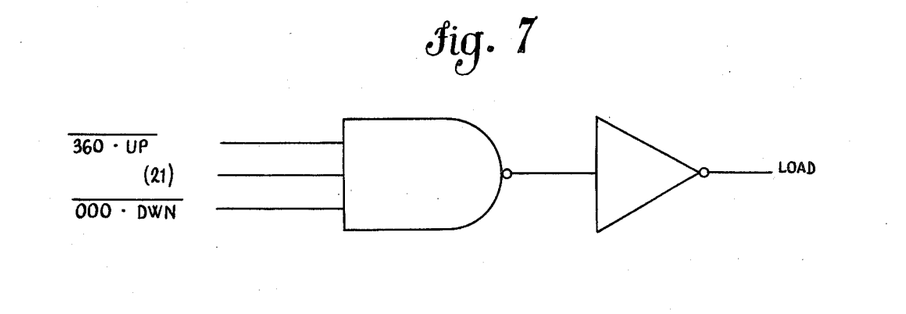
FIG. 7 shows a logic diagram of a load circuit.

Reference is made to FIG. 5 to be considered together with the FIGS. 3, 7 and 8.

Denoting by:

$\theta$ the head angle $\theta_1$ the selected head angle $\delta = \theta - \theta_1$ the error angle as indicator 134 is provided for the error $\delta$ consisting of two arrays of indicators for instance diodes LED denoted by 135, 136 each of which includes n LED diodes, symmetrically located with respect to a central diode $D_o$. The central diode $D_o$ will light when the error $\delta$ is equal to 0° or anyway $< \sim 1°$, while for $-n° \leq \delta \leq n°$ the corresponding diode will light. For $\delta > +n°$ the diode $D_{+n}$ will light, while for $\delta < -n°$ the diode $D_{-n}$ will light.

The data entry of the "selected head angle" can be made in various ways: for instance it is possible to use three switches (with three positions the hundred switch, and with ten positions those for the tens and units) so as to supply a $\theta_1$ in form of BCD signals. The data entry unit is denoted generally by 137.

At the start of a processing cycle, the three counters BCD (up/down) denoted by 138 are positioned at the value $\theta$ (coming from the circuits of FIG. 3) and sequentially they are caused to move, increasing or decreasing until the output from the counters 138 is coincident with $\theta_s$. This is obtained in a known way by the coincidence circuit 139. The number of counting pulses applied to the counters 138 for reaching the coincidence corresponds to the error angle $\delta$ expressed in degrees.

At the start of the cycle, the counting direction is undetermined, but if the duration of the signal (22) overcomes a pre-fixed value corresponding to about 180 clock pulses ($|\delta°| > 180°$) the circuit 142 for selecting the counting direction inverts the counting direction of the counters 138 and 141.

From this moment the direction of the count will remain unchanged until the condition whereby the signal (22) will overcome the aforesaid prefixed duration will occur again.

Figure 6:
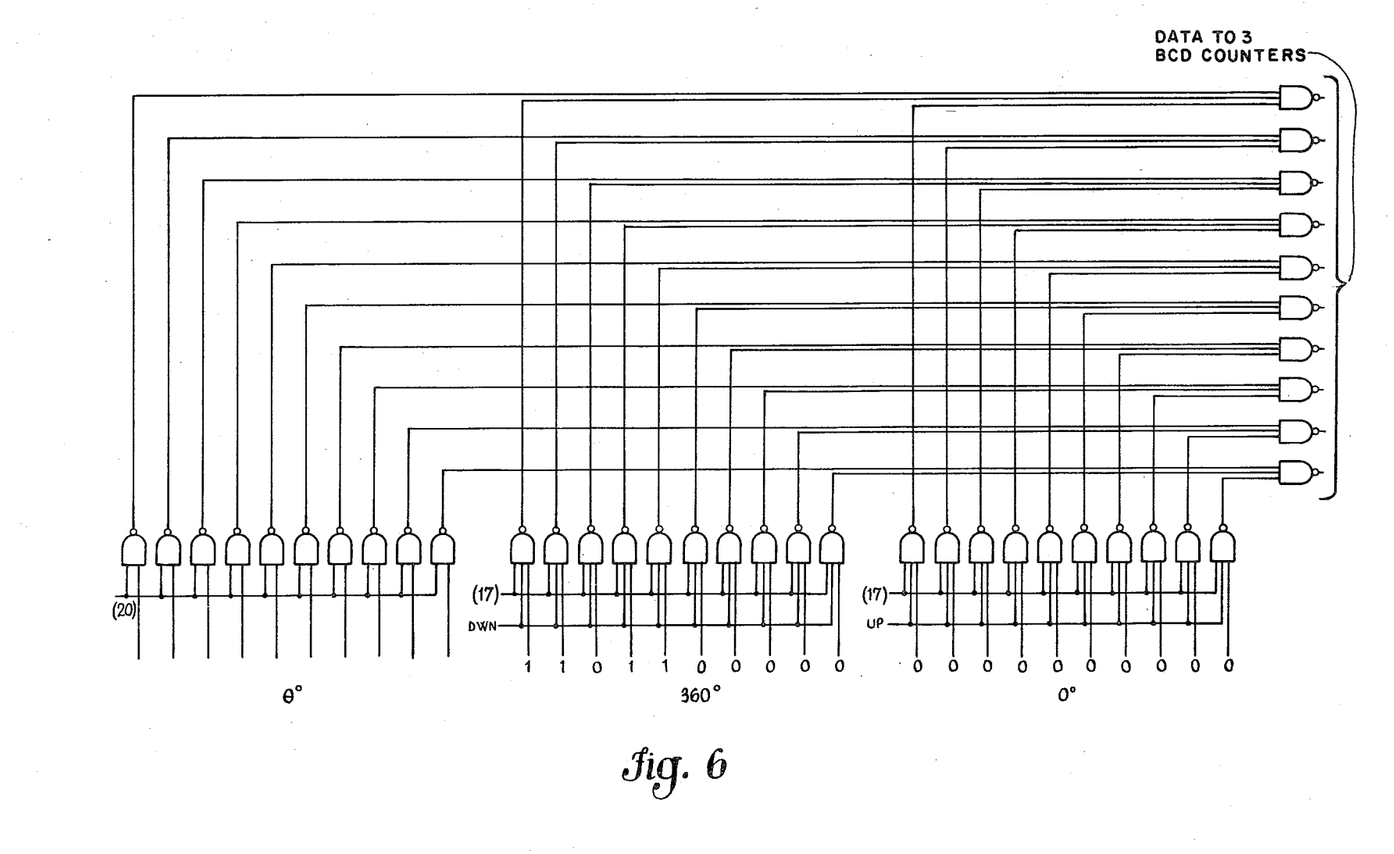
FIG. 6 shows a logic diagram of an electronic switch.

The signals "360°" and "000°" each consisting of a single bit are supplied by the block 139 of the coincidence circuits and have respectively the logic level "1" when the three counters BCD 138 are either in the state "360°" or "000°". The data input to the counters 138 is supplied by the electronic switch 140 shown in FIG. 6;

The value selected by the electronic switch 140 is:
- $-\theta$ when the signal (20) is at logic level "1";
- $-360°$ each time the signals (17) and DWN are both at logic level "1;"
- $-000$ each time the signals (17) and UP are both at logic level "1."

The unit of the Load circuits is shown in FIG. 7. A detailed specification thereof is deemed unnecessary. It will be sufficient to state that the loading of the Data Input into the counters BCD 138 occurs when the Load signal is at logic level ZERO.

Figure 8A:
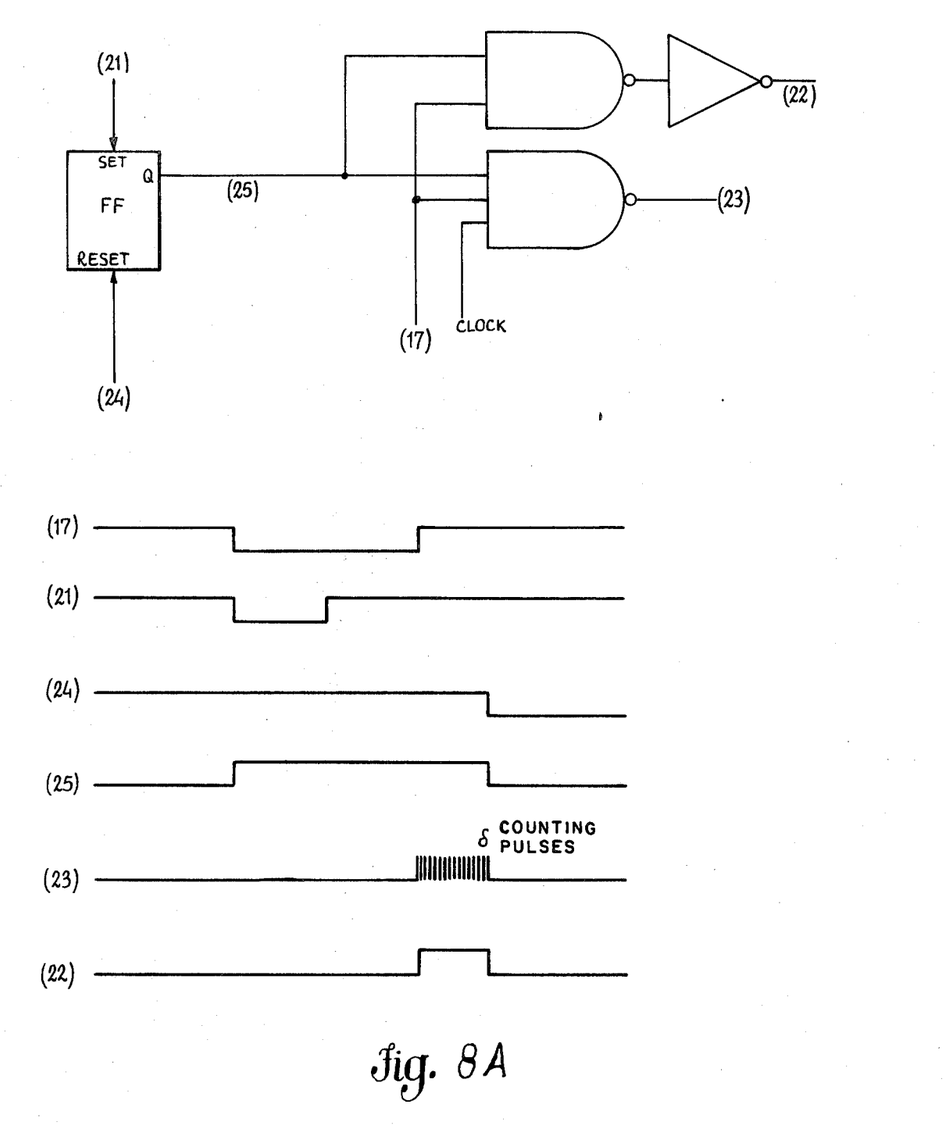
FIG. 8a shows wave forms associated with the gate circuit of FIG. 8.

The FIG. 8 shows the block of the gate circuits and FIG. 8A shows the wave forms forming the input into and the output from said block. The $\delta$ pulses of the wave form (23) of said FIG. 8A, besides causing the movement of the three counters BCD 138, are counted, increasing or decreasing, by the binary counter 141 which through a decoder associated thereto controls correspondingly the lightening of the diode LED $D\delta_o$.

Figure 9:
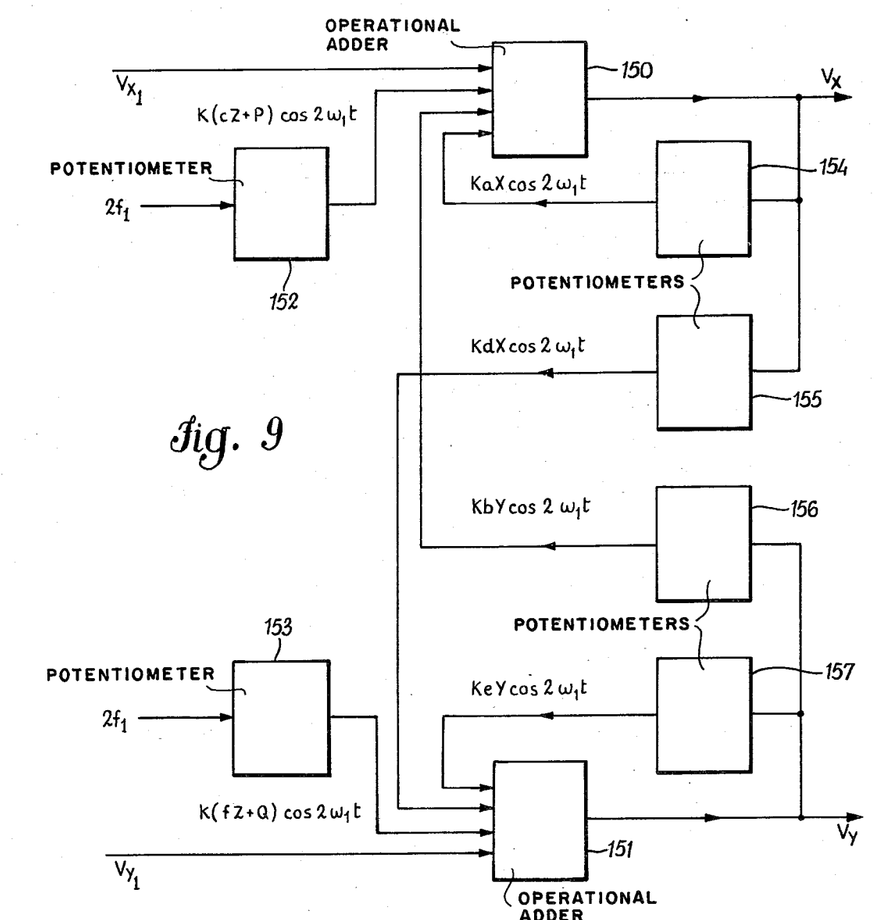
FIG. 9 shows a block diagram of a correction circuit.
Figure 10:
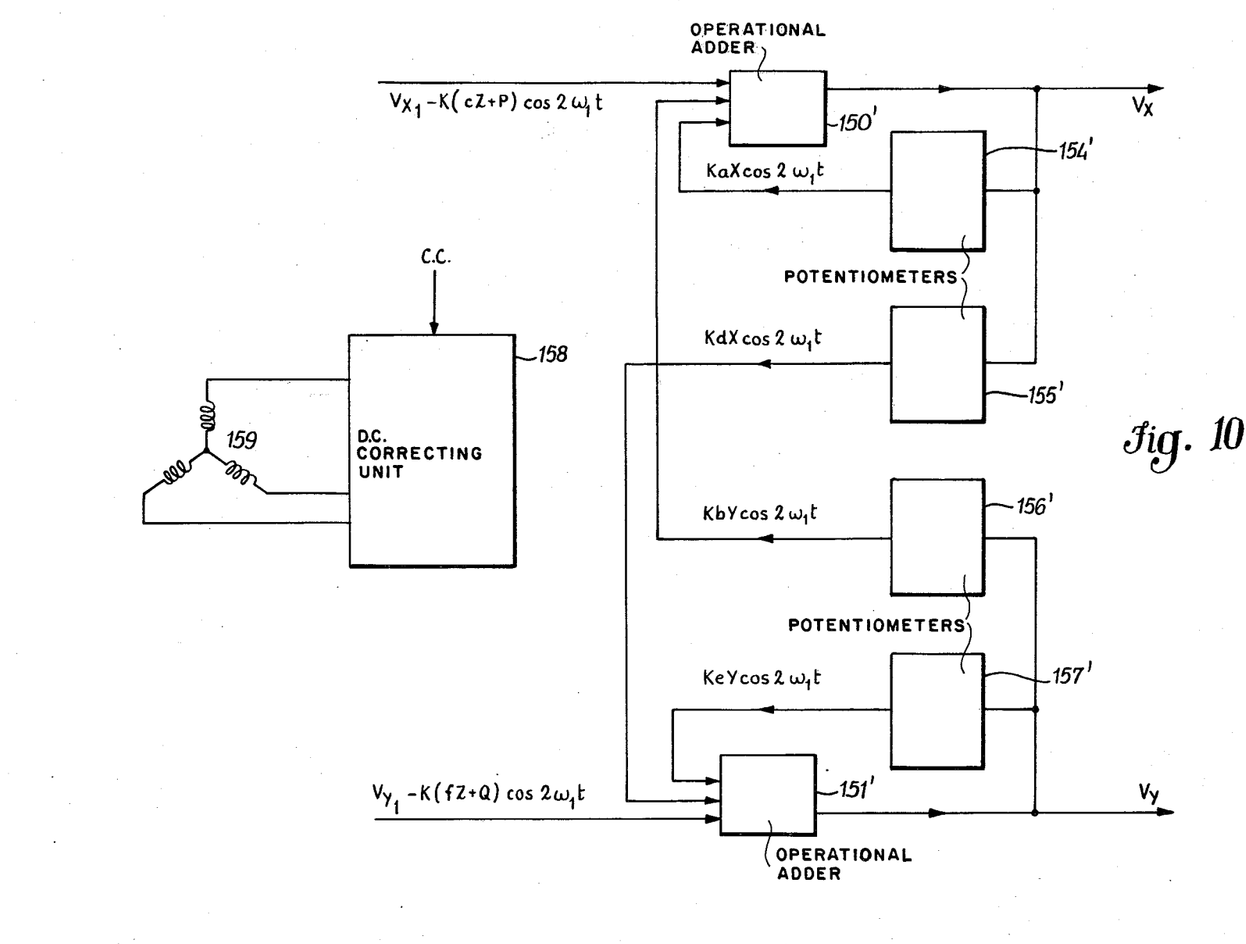
FIG. 10 shows a block diagram of a correction circuit simplified from FIG. 9.

With reference, now, to FIGS. 9 and 10, two circuits according to this invention will be described for correcting the permanent and induced magnetic fields.

In a compass system, the permanent magnetic fields which are independent of the heading of the craft whereon the compass is mounted must be corrected for, as well as the induced magnetic fields changing when the head angle value of $\theta$ changes, with respect to the horizontal component of the earth magnetic field.

The correction is carried out by correcting the uncorrected equations:

$$V_{X1} = K(X + aX + bY + cZ + P) \cos 2\omega_1 t \quad (4)$$

$$V_{Y1} = K(Y + dX + eY + fZ + Q) \cos 2\omega_1 t \quad (5)$$

to the corrected equations $$V_X = K'X \cos 2\omega_1 t \quad (9)$$

$$V_Y = K'Y \cos 2\omega_1 t \quad (10)$$

by subtracting from (4) the terms $$Ka\ X \cos 2\omega_1 t$$

$$Kb\ Y \cos 2\omega_1 t$$

$$(cZ + P) \cos 2\omega_1 t$$

and to subtract from (5) the terms $$K, \text{and, } Y \cos 2\omega_1 t$$

$$KdX \cos 2\omega_1 t$$

$$(fZ + Q) \cos 2\omega_1 t.$$

The circuit shown in FIG. 9 makes the subtractions as above indicated. The operational adders 150, 151 are fed by $V_{X1}$ and $V_{Y1}$ respectively.

Through the potentiometers 152, 153, . . . 157 are fed the amplitude and sign values shown in the figures which are applied to the operational adder 150, 151 in order to obtain the wanted corrections.

It will be noted that the terms $$(cZ + P), (fZ + Q)$$

are independent from $\theta$. As shown in FIG. 10 the structure of FIG. 9 can be simplified. Parts corresponding to those of FIG. 10 are denoted by primed reference numerals.

The group 158, 159 consists of a dc correcting unit for correcting the effect of the permanent magnetic fields. The resulting correction signals, are connected to secondary windings or suitable separate windings of the sensor.

Having thus described the present invention, what is claimed is:

1. In a static compass system for indicating the head-angle error with respect to a selected head angle by taking into consideration the deviation:
   (a) a magnetic sensor which generates sensor analog signals corresponding to the horizontal orthogonal components of the earth's magnetic field and the permanent and induced perturbing magnetic fields which it senses;
   (b) analog circuit means for receiving said analog signals and generating analog head-angle signals, said analog circuit means including means for eliminating the deviation in heading in accordance with the Poisson equations;
   (c) first digital circuit means receiving said analog head-angle signals from said analog circuit, said first digital circuit means comprising:
      (i) converter means for converting said analog signals into digital signals;
      (ii) counting means for quantifying the signal output from said converter means;
      (iii) memory and decoder means for storing and decoding the signal output from said counting means and generating decoded head-angle signals; and (iv) digital indicator means for receiving the decoded head-angle signals and displaying a decoded head angle corresponding thereto;

(d) selector circuit means in which a selected head angle can be manually entered and which provides an encoded signal corresponding thereto;

(e) a second digital circuit means comprising a comparator for comparing the decoded head-angle signal received from said first digital circuit means with said selected head-angle signal received from said selector circuit means and for supplying an error angle signal in accordance with said comparison;

(f) counter means for quantifying said error angle signal; and (g) display means for receiving said error angle signal and visually displaying an error angle corresponding thereto.

2. A compass as claimed in claim 1, wherein said analog circuit means includes compensating means for electronically correcting for permanent and induced perturbing fields, said compensating means including apparatus adjustable to effect an algebraic sum of selected terms of the Poisson equations, said Poisson equations being representative of the orthogonal components of the horizontal component of the magnetic field acting on the said magnetic sensor, and for applying the said algebraic sum to eliminate said deviation.

3. A compass as claimed in claim 2 wherein said compensating means comprises:

(a) potentiometer means for generating electrical signals for correction for said perturbing fields; and (b) operational adder means for separately subtracting said electrical signals from at least two said sensor analog signals.

4. The static compass system of claim 1 wherein said display means comprises two LED arrays symmetrically located with respect to a signal reference point corresponding to 0 (zero) off-course error.

5. In a static compass system, a method for indicating the head-angle error with respect to a selected head-angle by taking into consideration the deviation comprising:

(a) generating analog signals corresponding to the orthogonal components of the earth's magnetic field and permanent and induced perturbing magnetic fields influencing a magnetic sensor;

(b) eliminating the deviation in heading in accordance with the Poisson equations by analog circuit means and generating analog head-angle signals corrected by an amount corresponding thereto;

(c) converting said analog head-angle signals into digital head-angle signals;

(d) quantifying said digital head-angle signals by counting means capable of receiving said digital head-angle signals and outputting a coded head-angle signal in accordance therewith;

(e) storing and decoding the coded head-angle signal outputs from said counting means;

(f) displaying the decoded head-angle signal;

(g) entering a selected head-angle into a selector circuit means;

(h) comparing the said decoded head-angle signal received from said first digital circuit means with said selected head angle received from said selector circuit means and generating an error angle signal corresponding thereto;

(i) quantifying the said error angle signal by counter means; and (j) visually displaying an error angle corresponding to said error angle signal.

* * * * *